(12) United States Patent
Jen et al.

(10) Patent No.: US 8,098,460 B1
(45) Date of Patent: Jan. 17, 2012

(54) DUAL-STATE CLAMPING MECHANISM

(75) Inventors: Chih-Wu Jen, Longmont, CO (US); Chunjer C. Cheng, Saratoga, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 357 days.

(21) Appl. No.: 12/494,869

(22) Filed: Jun. 30, 2009

(51) Int. Cl.
*G11B 5/48* (2006.01)

(52) U.S. Cl. .................................................. 360/265.7

(58) Field of Classification Search ............... 360/265.7, 360/97.01
See application file for complete search history.

(56) References Cited

U.S. PATENT DOCUMENTS

| | | | |
|---|---|---|---|
| 5,339,702 A | 8/1994 | Viches | |
| 5,491,413 A | 2/1996 | Guzik | |
| 5,696,653 A | 12/1997 | Lacey | |
| 5,771,139 A | 6/1998 | Lee et al. | |
| 5,786,677 A | 7/1998 | Marr | |
| 5,844,420 A | 12/1998 | Weber et al. | |
| 5,991,123 A * | 11/1999 | Casey | 360/264.2 |
| 6,038,755 A | 3/2000 | Mendel et al. | |
| 6,140,661 A | 10/2000 | Nodelman | |
| 6,150,813 A | 11/2000 | Schadewald, Jr. et al. | |
| 6,236,201 B1 | 5/2001 | Kilicci et al. | |
| 6,346,809 B1 | 2/2002 | Karam, II | |
| 6,459,260 B1 | 10/2002 | Bonin et al. | |
| 6,472,866 B2 | 10/2002 | Aslami | |
| 6,510,752 B1 | 1/2003 | Sacks et al. | |
| 6,531,867 B1 | 3/2003 | Greene et al. | |
| 6,571,454 B1 | 6/2003 | Haney et al. | |
| 6,708,389 B1 | 3/2004 | Carlson et al. | |
| 7,061,235 B2 | 6/2006 | Guzik et al. | |
| 7,129,702 B2 | 10/2006 | Mori et al. | |
| 7,135,861 B2 | 11/2006 | Mori et al. | |
| 7,183,762 B2 | 2/2007 | Yamamoto | |
| 7,194,802 B2 | 3/2007 | Fayeulle et al. | |
| 7,196,512 B2 | 3/2007 | Kainuma et al. | |
| 7,203,018 B1 * | 4/2007 | Kummli et al. | 360/75 |
| 7,248,039 B2 | 7/2007 | Green et al. | |
| 7,288,935 B2 | 10/2007 | Farren et al. | |
| 7,315,435 B1 * | 1/2008 | Pan | 360/245.2 |
| 7,403,357 B1 * | 7/2008 | Williams | 360/245.9 |
| 7,429,857 B2 | 9/2008 | Guzik et al. | |
| 7,452,213 B2 | 11/2008 | Herdendorf et al. | |
| 2003/0042895 A1 | 3/2003 | Mihara et al. | |
| 2006/0152856 A1 | 7/2006 | Zhao et al. | |
| 2006/0236527 A1 | 10/2006 | Davis et al. | |
| 2007/0046286 A1 | 3/2007 | Umezaki et al. | |
| 2007/0136022 A1 | 6/2007 | Anderson et al. | |
| 2007/0143053 A1 | 6/2007 | Holwell et al. | |
| 2007/0143054 A1 | 6/2007 | Anderson et al. | |
| 2007/0143055 A1 | 6/2007 | Anderson et al. | |
| 2007/0143056 A1 | 6/2007 | Anderson et al. | |
| 2007/0205763 A1 | 9/2007 | Yamasaki | |
| 2008/0060445 A1 | 3/2008 | Obergfell et al. | |
| 2008/0061776 A1 | 3/2008 | Collins et al. | |
| 2008/0062564 A1 | 3/2008 | Warn | |
| 2008/0247091 A1 | 10/2008 | Guzik et al. | |

* cited by examiner

*Primary Examiner* — Mark Blouin

(57) ABSTRACT

An apparatus is provided for releasably holding a contact pad of a head gimbal assembly in electrical contact with a flex cable assembly of an actuator coil assembly. The apparatus includes a clamp body pivotally connected to an actuator body of the actuator coil assembly and moveable between an open position and a closed position, and a latch rotatably connected to the clamp body and operable to selectively position the clamp body in the open and closed positions. The clamp body is configured to apply pressure to the contact pad of the head gimbal assembly to make electrical contact with the flex cable assembly when the contact pad is arranged on the flex cable assembly and the clamp body in the closed position.

19 Claims, 6 Drawing Sheets

DUAL-STATE CLAMPING MECHANISM

FIELD

The present disclosure generally concerns a hard drive component testing platform and, in particular, is directed to a dual-state clamping mechanism for releasably connecting a head gimbal assembly to an actuator.

BACKGROUND

Component testing plays an important role during the manufacture and assembly of hard drives. Testing individual components allows the manufacturer to determine whether specifications of a new design have been met prior to incorporating the new component into a fully assembled hard drive. Testing representative component samples provides a measure of quality control that may prevent the wasteful assembly of a large number of hard drives using a faulty batch of components. However, many conventional hard drive component testing systems fail to create a testing environment similar to that experienced by components in an operating hard drive. Accordingly, these conventional systems are limited in the number and range of parameters that can be tested before the component is incorporated into a working hard drive.

Conventional testing systems typically are expensive and relatively complex systems. Conventional testing systems may cost several hundreds of thousands, and possibly millions, of dollars to purchase and maintain. This expense limits the number of testing systems a manufacturer can purchase given a limited budget, which correspondingly limits the number of components that can be tested within a given time frame. Many conventional component testing systems are complex pieces of equipment requiring special training and/or special tools to set up and operate. This complexity limits the efficiency and increases the overall costs associated with operating and maintaining the systems.

SUMMARY

The dual-state clamping mechanism described in the present disclosure is part of a hard drive component testing platform designed to address the foregoing deficiencies of conventional testing systems. This novel hard drive component testing platform is designed to use as many production hard drive components as possible to both keep down costs of the testing platform and to help recreate a testing environment similar to that experienced by components in an operating hard drive. As described herein, various structures from production hard drives have been modified to provide a reliable and ease to use testing platform.

According to one aspect of the present disclosure, an apparatus is described for releasably holding a contact pad of a head gimbal assembly in electrical contact with a flex cable assembly of an actuator coil assembly. The apparatus includes a clamp body pivotally connected to an actuator body of the actuator coil assembly and moveable between an open position and a closed position, and a latch rotatably connected to the clamp body and operable to selectively position the clamp body in the open and closed positions. The clamp body is configured to apply pressure to the contact pad of the head gimbal assembly to make electrical contact with the flex cable assembly when the contact pad is arranged on the flex cable assembly and the clamp body in the closed position.

According to another aspect of the present disclosure, an actuator coil assembly is described that includes an actuator body comprising an arm and a coil support, a pivot assembly set in a bore of the actuator body and aligned with a pivot axis of the actuator coil assembly, and a flex cable assembly attached to the actuator body. A coil is attached to the coil support of the actuator body and electrically coupled to the flex cable assembly. A clamping mechanism is connected to the actuator body and is configured to releasably hold a contact pad of a head gimbal assembly in electrical contact with the flex cable assembly.

According to another aspect, a method is described for releasably holding a contact pad of a head gimbal assembly in electrical contact with a flex cable assembly of an actuator coil assembly. The method includes operating a latch rotatably connected to a clamp body to position the clamp body in an open position, wherein the clamp body is pivotally connected to an actuator body of the actuator coil assembly. The contact pad of the head gimbal assembly is positioned on the flex cable assembly, and the latch is operated to position the clamp body in a closed position, wherein the clamp body is configured to apply pressure to the contact pad of the head gimbal assembly to make electrical contact with the flex cable assembly in the closed position.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components have been simplified or omitted from the figures to avoid obscuring the concepts of the subject technology.

Figure 1:
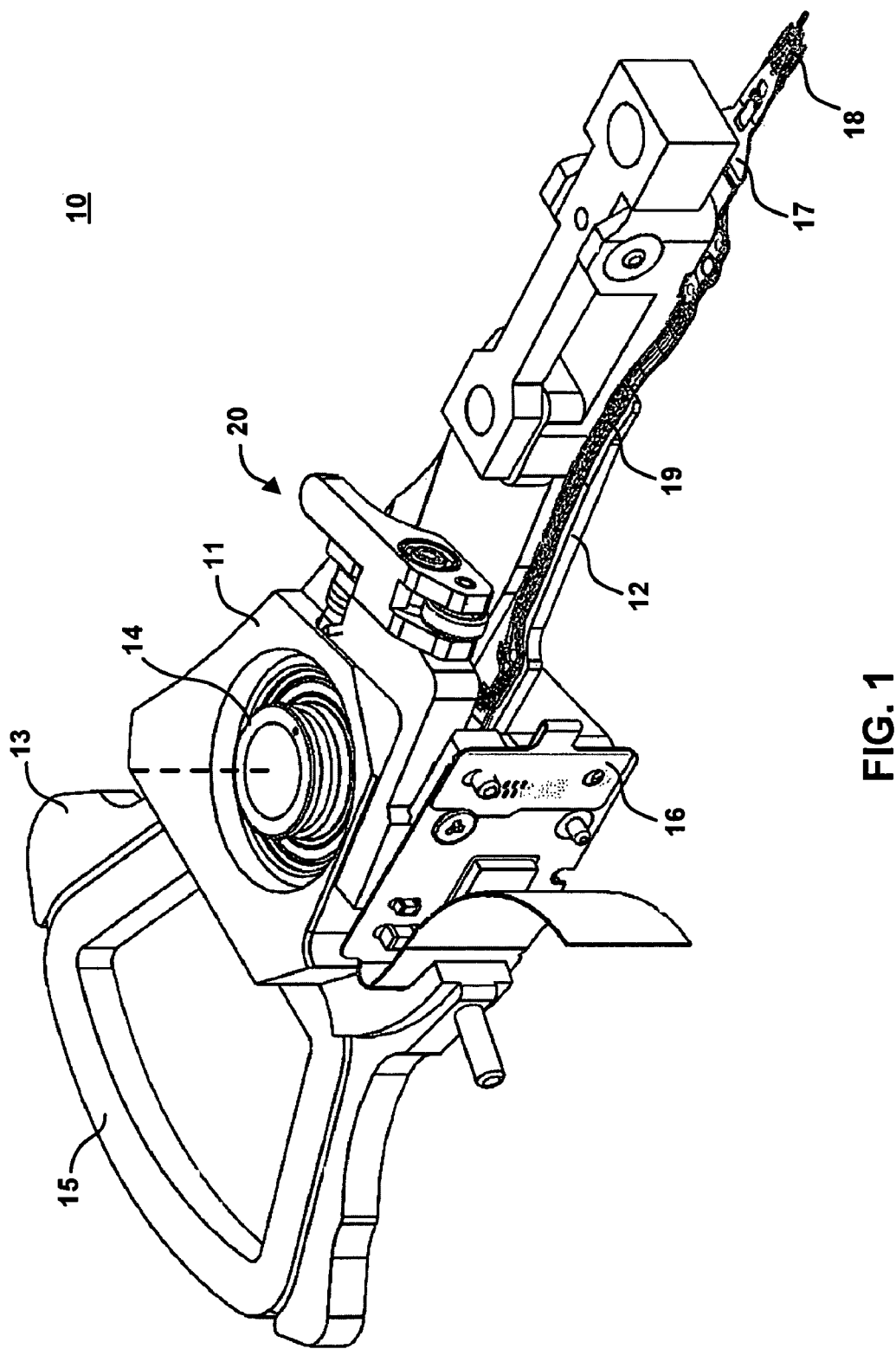
FIG. 1 is a perspective view of an actuator coil assembly according to one embodiment.

FIG. 1 is a perspective view of actuator coil assembly 10 according to one embodiment. As depicted in FIG. 1, actuator coil assembly 10 includes actuator body 11, arm 12 and coil support 13. Actuator coil assembly 10 further includes pivot assembly 14, coil 15 and flex cable assembly 16.

Pivot assembly 14 is set in a bore located in actuator body 11. Pivot assembly 14 comprises one or more bearings which allow actuator coil assembly 10 to be pivotally mounted in a hard drive component testing platform. For example, pivot assembly 14 may include an outer race, which is fixed to an inner surface of the bore in actuator body 11, and an inner race, which is secured to the testing platform using a screw or other type of fastener, with ball or roller bearings positioned between the inner and outer races. The outer race of pivot assembly 14 may be fixed to the inner surface of the bore in actuator body 11 using a pressure fit, an adhesive, a weld, or other known techniques that prevent relative slippage between the outer race of pivot assembly 14 and the inner surface of the bore. Pivot assemblies such as the one described above are commonly used in hard drives and those skilled in the art will readily recognize the general operation of pivot assembly 14 as well as alternative structures that may be used to pivotally mount actuator coil assembly 10 in a testing platform that are within the contemplated scope of the subject technology.

Actuator body 11, arm 12 and coil support 13 may be machined from a single block of material to form a unitary structure. The material used to form this structure may be selected from a number of different metals and metal alloys. For example, stainless steel may be used to provide a strong, rigid structure that is durable enough to withstand repeated mounting and dismounting of head gimbal assemblies for testing in the testing platform. Because the access speed of moving a head gimbal assembly to an intended position may not be critical in a testing environment, relatively heavy stainless steel can be used in place of conventionally used lighter materials such as aluminum and aluminum alloys. However, the scope of the subject technology is not limited to using stainless steel for these components, which may be implemented using other metals and metal alloys, including aluminum or aluminum alloys, that familiar to those skilled in the art.

Coil 15 is a coil of conductive wire, such as copper wire, arranged between and attached to prongs of coil support 13. Coil 15 may be attached to coil support 13 using any of a number of adhesives known to those of skill in the art. When actuator coil assembly 10 is pivotally mounted in a testing platform, coil 15 is positioned adjacent to one or more magnets which, together with coil 15, forms a voice coil motor. By controlling current flowing through the wire of coil 15, the voice coil motor may be used to pivot and precisely position actuator coil assembly 10 around a pivot axis. The pivot axis is represented in FIG. 1 by a dashed line aligned with a central axis of pivot assembly 14. The operation of the voice coil motor to position actuator coil assembly 10 may be generally the same as that used to position an actuator in a hard drive and well known to those skilled in the art.

Flex cable assembly 16 is mounted to actuator body 11 and provides electrical connections between actuator coil assembly 10 and a printed circuit board assembly containing power and control circuits for operating actuator coil assembly 10. In particular, flex cable assembly 16 is electrically coupled to coil 15 and is arranged to be in electrical contact with contact pads of a head gimbal assembly detachably mounted to actuator coil assembly 10. The power and control circuits of the printed circuit board assembly may be used to position actuator coil assembly 10 and to test a detachably mounted head gimbal assembly. The printed circuit board assembly may be similar or identical to printed circuit board assemblies used in production hard drives, the configuration and operation of which are known to those skilled in the art.

FIG. 1 depicts a head gimbal assembly detachably mounted to actuator coil assembly. The head gimbal assembly includes suspension 17 on which slider 18 is mounted. Slider 18 contains read and write heads used to read and write data onto a magnetic disk. Flex trace 19 includes conductive traces arranged on a flexible substrate. The conductive traces are electrically coupled to the read and write heads on slider 18 at a first end of flex trace 19, and terminate in one or more contact pads at a second end of flex trace 19 opposite the first end. The head gimbal assembly may be detachably mounted to arm 12 using a head gimbal assembly mounting mechanism such as the mounting mechanism described in the patent application entitled "Head Gimbal Assembly Mounting Mechanism" Ser. No. 12/500,546 filed Jul. 9, 2009, which is hereby incorporated by reference herein.

Actuator coil assembly 10 described above is similar to actuator coil assemblies used in hard drives and certain components, such as pivot assembly 14 and coil 15, may be identical to those used in hard drives. However, actuator coil assembly 10 is modified to facilitate releasably holding the one or more contact pads of the head gimbal assembly in electrical contact with flex cable assembly 16. For example, actuator coil assembly 10 is modified to include dual-state clamping mechanism 20, which is operable to be selectively positioned in an open position, which allows the one or more contact pads of a head gimbal assembly to be arranged on flex cable assembly 16, and a closed position, which applies pressure to the one or more contact pads to make electrical contact with flex cable assembly 16. The operation of clamping mechanism 20 will be described in more detail below.

Figure 2:
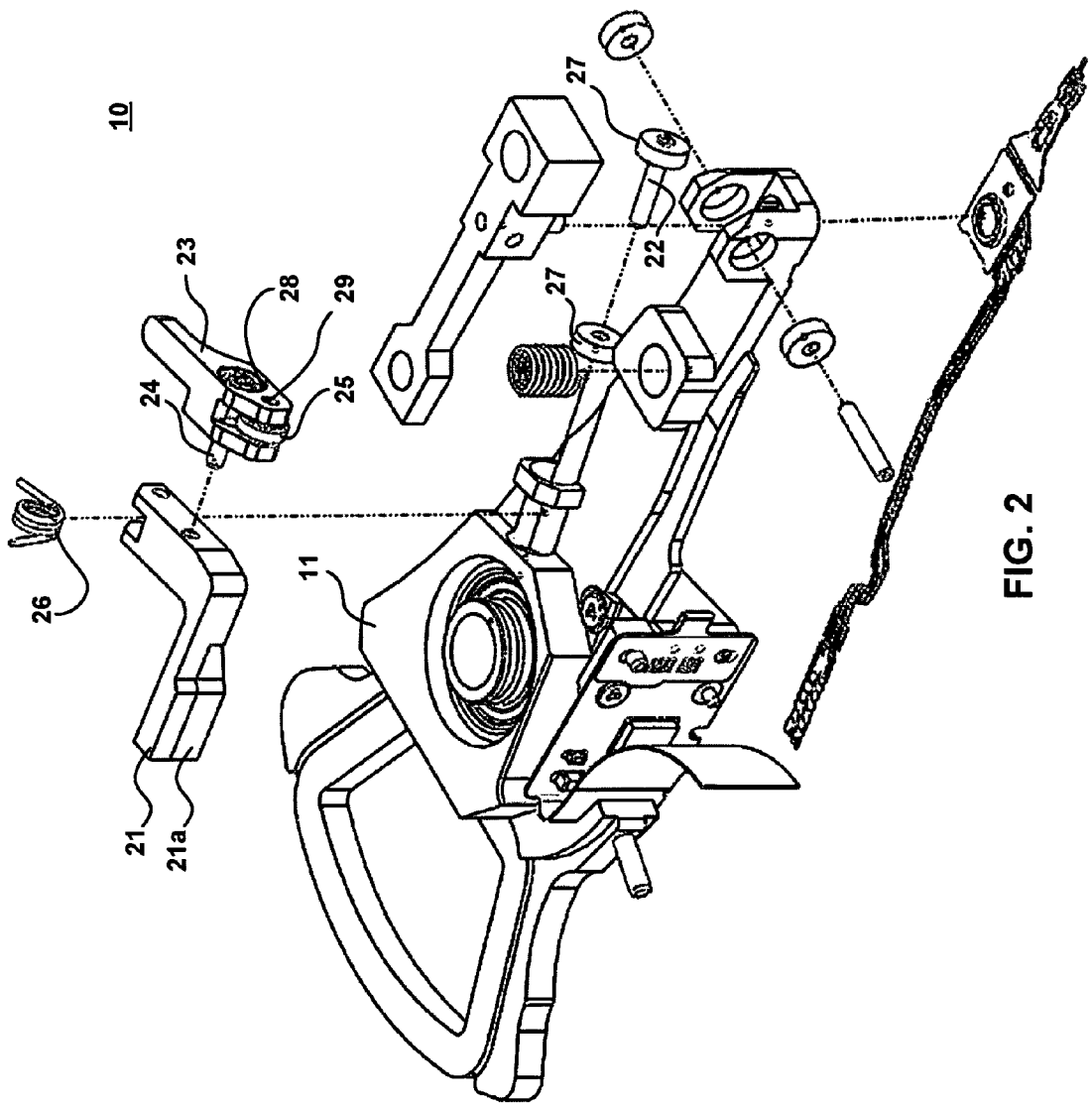
FIG. 2 is an exploded view of an actuator coil assembly according to one embodiment.

FIG. 2 is an exploded view of actuator coil assembly 10 provided to illustrate components of clamping mechanism 20 according to one embodiment. As shown in FIG. 2, clamping mechanism 20 includes clamp body 21, pivot pin 22, latch 23, pivot pin 24, roller 25 and spring 26. Clamp body 21 is pivotally connected to actuator body 11 with pivot pin 22. Pivot pin 22 may be rotationally supported by bearings 27 mounted in actuator body 11. Latch 23 is rotatably connected to clamp body 21 with pivot pin 24. Similar to pivot pin 22, pivot pin 24 may be rotatably supported by bearing 28 mounted in latch 23. Roller 25 is rotatably connected to a first end of latch 23 with pivot pin 29. Spring 26 is arranged with a first leg connected to actuator body 11 and a second leg connected to clamp body 21 to allow clamping mechanism 20 to maintain either of two stable states. The operation of clamping mechanism 20 will now be described in more detail.

Figure 3:
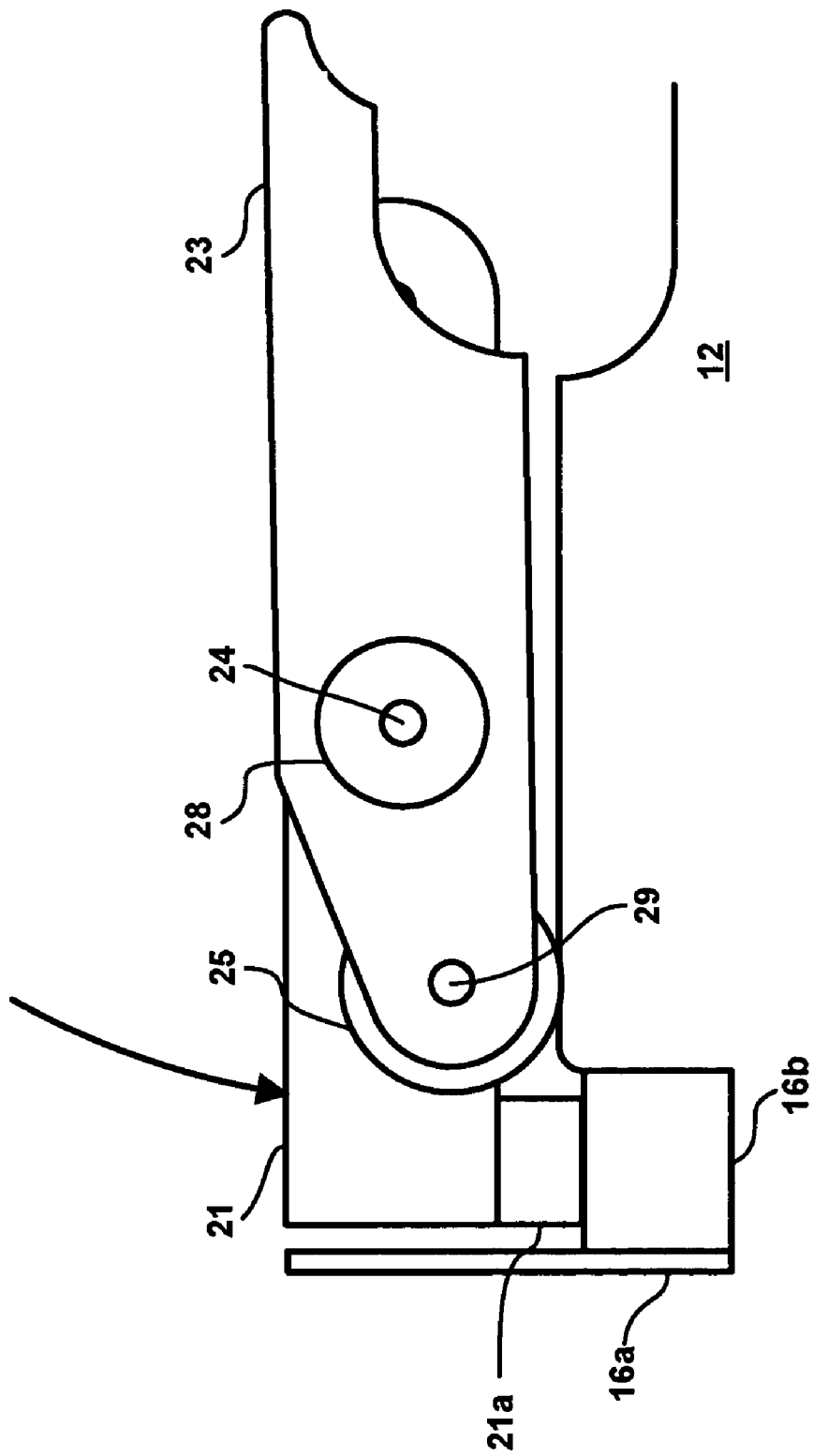
FIG. 3 is a profile view of a clamping mechanism in a closed position according to one embodiment.

FIG. 3 is a profile view of the clamping mechanism in a closed position according to one embodiment. As represented in FIG. 3, clamp body 21 and latch 23 lie approximately parallel with an upper surface of arm 12 of actuator coil assembly with clamp face 21a adjacent to an upper surface of flex cable assembly 16 when in the closed position. Spring 26, which is not shown in FIG. 3, is pre-loaded such that it exerts a force on clamp body 21 in a direction represented by the arrow to maintain the clamping mechanism in the closed position. The force exerted by spring 26 on clamp body 21 applies contact pressure to the contact pads on the tail of flex trace 19 of the head gimbal assembly to make electrical contact with contact points on the upper surface of contact base 16b of flex cable assembly 16.

Figure 4:
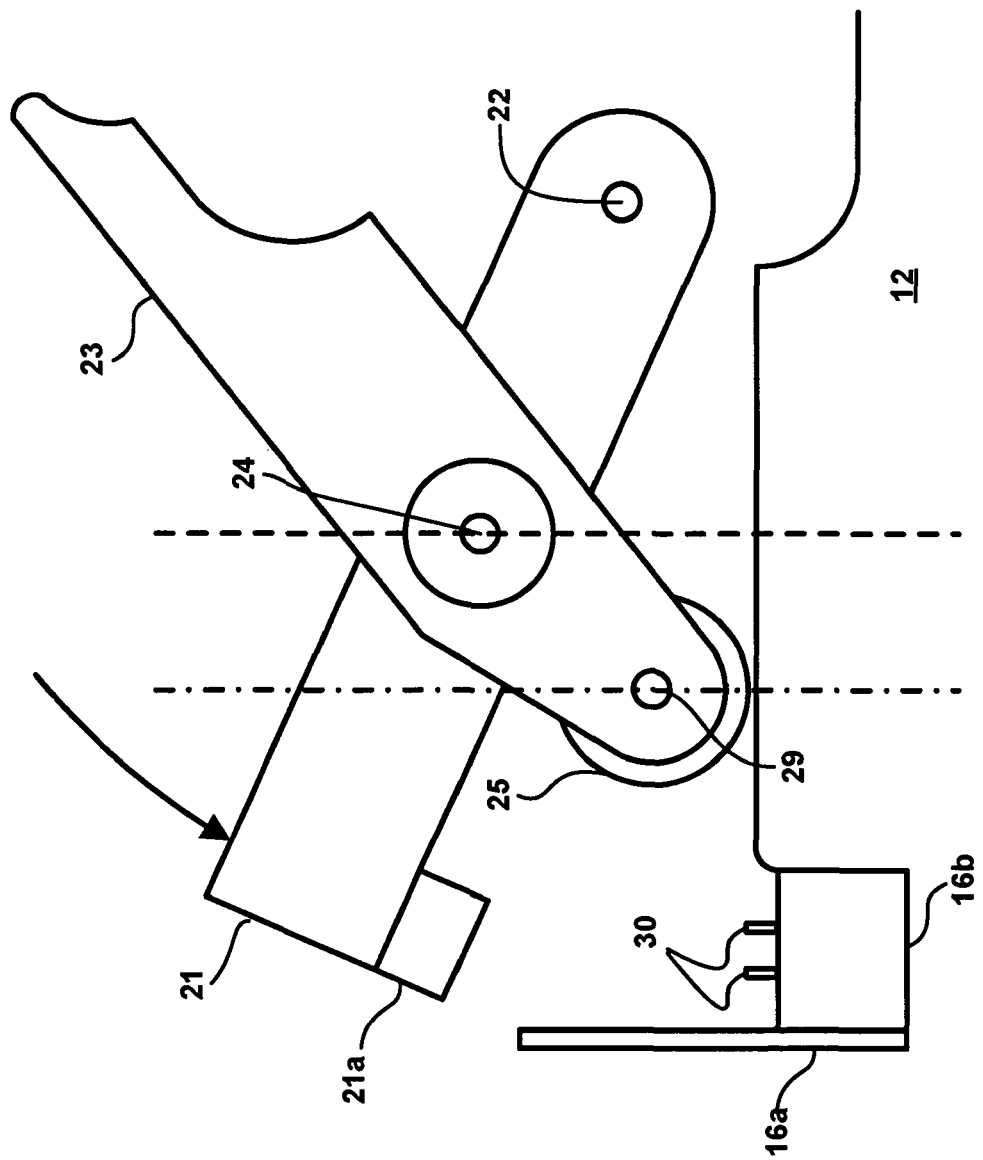
FIG. 4 is a profile view of a clamping mechanism in between a closed position and an open position according to one embodiment.

FIG. 4 is a profile view of clamping mechanism 20 in an intermediate position between the open and closed positions according to one embodiment. As indicated above, latch 23 is rotatably connected to clamp body 21 with pivot pin 24 and clamp body 21 is pivotally connected to actuator body 11 with pivot pin 22. Furthermore, roller 25 is arranged to rotate around pivot pin 29 connected to the first end of latch 23. Pivot pin 29 defines a first axis about which roller 25 rotates. Pivot pin 22 defines a second axis about which clamp body 21 pivots with respect to actuator body 11. Pivot pin 24 defines a third axis about which latch 23 rotates with respect to clamp body 21. Clamping mechanism 20 is arranged such that the first, second and third axes are parallel to one another.

To operate clamping mechanism 20 to selectively position clamping body 21 in the open position, the second end of latch 23 opposite the first end to which roller 25 is connected is elevated with respect to the upper surface of arm 12. As the second end of latch 23 is elevated, latch 23 rotates with respect to clamp body 21, and roller 25 rolls along the upper surface of arm 12 away from contact base 16b of flex cable assembly 16. This movement of latch 23 creates leverage against the force exerted by spring 26 on clamp body 21 and causes clamp body 21 to pivot around pivot pin 22 away from the upper surface of contact base 16b of flex cable assembly 16. As clamp body 21 pivots in this direction, the load on spring 26 is increased thereby increasing the force exerted on clamp body 21 to return to the closed position.

Figure 5:
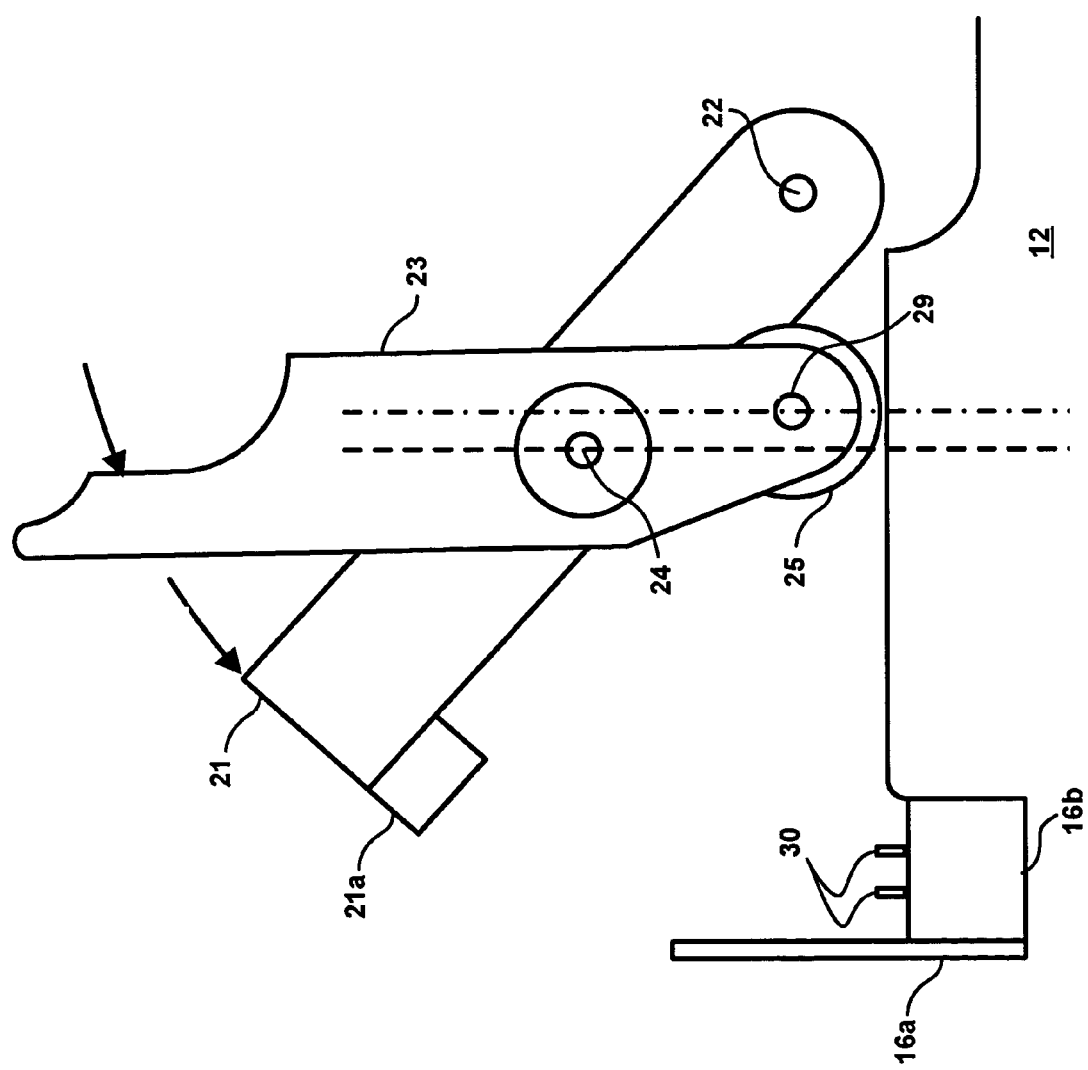
FIG. 5 is a profile view of a clamping mechanism in an open position according to one embodiment.

FIG. 5 is a profile view of clamping mechanism 20 in the open position according to one embodiment. As latch 23 is elevated, the relative lateral positions of the first, second and third axes corresponding to pivot pin 29, pivot pin 22 and pivot pin 24, respectively, shift. Once the first axis corresponding to pivot pin 29 moves closer laterally to the second axis corresponding to pivot pin 22, the force exerted on clamp body 21 by spring 26 is also exerted on latch 23 in the same direction, represented by the two arrows shown in FIG. 5, through the rotatable connection between the two components. The relative lateral position of the first axis corresponding to pivot pin 29 is represented by the dashed-dotted vertical line shown in FIGS. 4 and 5. The relative lateral position of the third axis corresponding to pivot pin 24 is represented by the dashed lines in FIGS. 4 and 5. This force causes latch 23 to continue to rotate until either roller 25 or latch 23 comes to rest against the structure of actuator body 11 pivotally supporting clamp body 21. Alternatively, a stop may be fashioned in actuator body 11 that limits the rotation of clamp body 21 as latch 23 is elevated. Once latch 23 and/or clamp body 21 reaches the stopping point of rotation, which represents the open position, the force exerted by spring 26 on clamp body 21 keeps clamp body 21 and latch 23 in the open position until the second end of latch 23 is moved in the opposite direction towards the upper surface of arm 12, at which time the force exerted by spring 26 returns the clamping mechanism to the closed position as shown in FIG. 3.

As represented in FIGS. 4 and 5, a plurality of pogo pins 30 are arranged in the contact base 16b of flex cable assembly 16. Pogo pins 30 provide electrical contact points for the contact pads arranged on the tail end of the flex trace of a head gimbal assembly. FIG. 6A represents a top view of flex stiffener 16a and contact base 16b of flex cable assembly 16 with six pogo pins 30 arranged in contact base 16b. According to one embodiment, the six pogo pins 30 are configured to provide read/write signals, power and ground from a printed circuit board assembly to read/write heads of a head gimbal assembly mounted on actuator coil assembly 10. Those skilled in the art will recognize that other numbers and arrangements of pogo pins 30 may be used to provide signals to a mounted head gimbal assembly. In addition, other types of contact points may be used in place of pogo pins to make electrical contact with the contact pads of the flex trace of the head gimbal assembly.

Figure 6B:
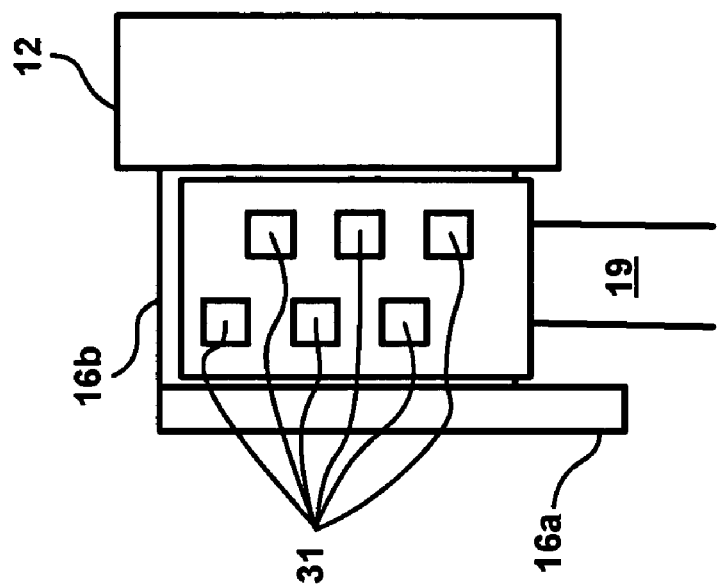
FIG. 6B is a top view diagram depicting an arrangement of contact pads in a flex trace of a head gimbal assembly according to one embodiment.
Figure 6A:
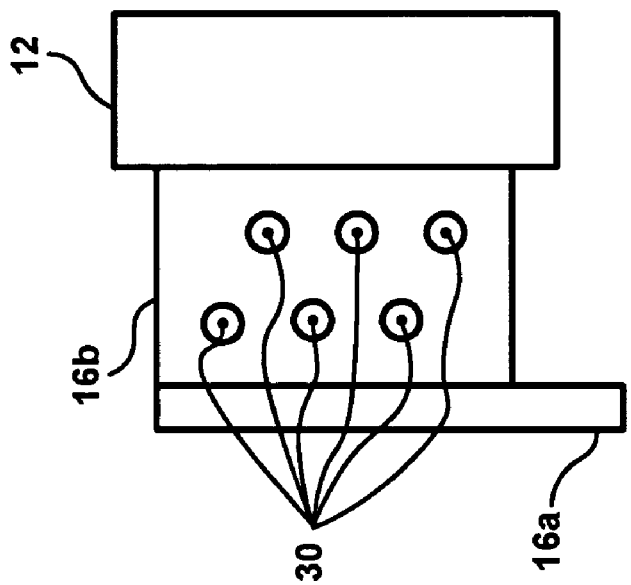
FIG. 6A is a top view diagram depicting an arrangement of pogo pins in a flex cable assembly according to one embodiment.

FIG. 6B represents a top view flex stiffener 16a and contact base 16b of flex cable assembly 16 with the tail end of flex trace 19 positioned over pogo pins 30. As shown in FIG. 6B, six contact pads 31 are arranged on the tail end of flex trace 19 in a similar arrangement as pogo pins 30 shown in FIG. 6A. The inner wall of flex stiffener 16a and the edge of arm 12 may be used to help align contact pads 31 of flex trace 19 with pogo pins 30 arranged in contact base 16b. An operator may place the tail end of flex trace 19 over the top of contact base 16 while the clamping mechanism is in the open position. Once the tail end of flex trace 19 is in place, the operator may move the clamping mechanism to the closed position, as described above. In the closed position, the force exerted by spring 26 on clamping body 21 applies contact pressure to pads 31 to establish electrical contact with respective pogo pins 30. Because the clamping mechanism is stable in either the open position or the closed position, placement of the tail end of flex trace 19 is simplified for an operator by allowing operation of the clamping mechanism using only one hand.

Clamping body 21 and latch 23 may be made from a number of different materials. Preferably the materials or both durable and lightweight, such as aluminum or an aluminum alloy. Because clamping body 21 is used to apply contact pressure to contact pads 31, an insulative clamp face 21a may be attached to clamp body 21 as shown in FIGS. 3 to 5. Clamp face 21a may be made from an electrical static discharge safe plastic in order to prevent charge build up and possible damage to contact pads 31 and the electrical components connected thereto. As noted above, clamping body 21 applies pressure to establish electrical contact between contact pads 31 and respective pogo pins 30. In order to prevent pogo pins 30 from penetrating and damaging contact pads 31 when this pressure is applied, clamp face 21a may be made from an ESD safe elastomer. Alternatively, dimples may be formed in the surface of clamp face 21a opposite contact pads 31 to provide room for contact pads 31 to flex as needed to avoid penetration by pogo pins 30. Those skilled in the art will recognize other materials that may be suitable for constructing clamping body 21, clamp face 21a, and latch 23.

The actuator coil assembly described herein provides a user friendly mechanism for releasably holding the contact pads of a head gimbal assembly in electrical contact with a flex cable assembly. A method for releasably holding the contact pad of the head gimbal assembly in electrical contact with a flex cable assembly of an actuator coil assembly includes operating a latch rotatably connected to a clamp body to position the clamp body in an open position, wherein the clamp body is pivotally connected to an actuator body of the actuator coil assembly. The contact pad of the head gimbal assembly is positioned on the flex cable assembly, and the latch is operated to position the clamp body in a closed position. The clamp body is configured to apply pressure to the contact pad of the head gimbal assembly to make electrical contact with the flex cable assembly in the closed position. This arrangement of the actuator coil assembly and method for releasably holding the a contact pad in electrical contact with a flex cable assembly facilities relatively quick and tool-free exchanges of head gimbal assemblies in a hard drive component testing platform.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus for releasably holding a contact pad of a head gimbal assembly in electrical contact with a flex cable assembly of an actuator coil assembly, the apparatus comprising:
   a clamp body pivotally connected to an actuator body of the actuator coil assembly and moveable between an open position and a closed position; and
   a latch rotatably connected to the clamp body and operable to selectively position the clamp body in the open and closed positions,
   wherein the clamp body is configured to apply pressure to the contact pad of the head gimbal assembly to make electrical contact with the flex cable assembly when the contact pad is arranged on the flex cable assembly and the clamp body in the closed position.

2. The apparatus according to claim 1, wherein the clamp body and the latch are stable in the open and closed positions.

3. The apparatus according to claim 1, further comprising an insulative clamp face attached to the clamp body, wherein the insulative clamp face is arranged to apply pressure to the contact pad arranged on the flex cable assembly when the clamp body is in the closed position.

4. The apparatus according to claim 3, wherein the insulative clamp face is made of an elastomer.

5. The apparatus according to claim 1, further comprising a spring having a first leg connected to the actuator body and a second leg connected to the clamp body,
   wherein the spring is arranged to exert a force on the clamp body in a direction from the open position to the closed position.

6. The apparatus according to claim 5, further comprising a roller rotatably connected to a first end of the latch,
   wherein the roller is arranged to rotate around a first axis and remain in contact with the actuator body during operation of the latch.

7. The apparatus according to claim 6, wherein the clamp body is pivotally connected to the actuator body with a first pivot pin defining a second axis about which the clamp body moves between the open and closed positions,
   wherein the latch is rotatably connected to the clamp body with a second pivot pin defining a third axis about which the latch rotates with respect to the clamp body, and
   wherein the first, second and third axes are parallel.

8. An actuator coil assembly comprising:
   an actuator body comprising an arm and a coil support;
   a pivot assembly set in a bore of the actuator body and aligned with a pivot axis of the actuator coil assembly;
   a flex cable assembly attached to the actuator body;
   a coil attached to the coil support of the actuator body and electrically coupled to the flex cable assembly; and
   a clamping mechanism connected to the actuator body and configured to releasably hold a contact pad of a head gimbal assembly in electrical contact with the flex cable assembly.

9. The actuator coil assembly according to claim 8, the clamping mechanism comprising:
   a clamp body pivotally connected to the actuator body and moveable between an open position and a closed position; and
   a latch rotatably connected to the clamp body and operable to selectively position the clamp body in the open and closed positions,
   wherein the clamp body is configured to apply pressure to the contact pad of the head gimbal assembly to make electrical contact with the flex cable assembly when the contact pad is arranged on the flex cable assembly and the clamp body in the closed position.

10. The actuator coil assembly according to claim 9, the clamping mechanism further comprising a spring having a first leg connected to the actuator body and a second leg connected to the clamp body,
    wherein the spring is arranged to exert a force on the clamp body in a direction from the open position to the closed position.

11. The actuator coil assembly according to claim 10, the clamping mechanism further comprising a roller rotatably connected to a first end of the latch,
    wherein the roller is arranged to rotate around a first axis and remain in contact with the actuator body during operation of the latch.

12. The actuator coil assembly according to claim 11, wherein the clamp body is pivotally connected to the actuator body with a first pivot pin defining a second axis about which the clamp body moves between the open and closed positions, wherein the latch is rotatably connected to the clamp body with a second pivot pin defining a third axis about which the latch rotates with respect to the clamp body, and wherein the first, second and third axes are parallel.

13. The actuator coil assembly according to claim 9, the clamping mechanism further comprising an insulative clamp face attached to the clamp body,
wherein the insulative clamp face is arranged to apply pressure to the contact pad arranged on the flex cable assembly when the clamp body is in the closed position.

14. The actuator coil assembly according to claim 13, wherein the insulative clamp face is made of an elastomer.

15. The actuator coil assembly according to claim 9, wherein the clamp body and the latch substantially parallel with the actuator body when the clamp body is in the closed position.

16. The actuator coil assembly according to claim 9, wherein the flex cable assembly comprises a pogo pin arranged to make electrical contact with the contact pad of the head gimbal assembly when the clamp body applies pressure to the contact pad arranged on the flex cable assembly in the closed position,
wherein a spring-loaded pin of the pogo pin is pressed into a cylinder of the pogo pin by the clamp body in the closed position.

17. The actuator coil assembly according to claim 16, wherein the head gimbal assembly comprises a plurality of contact pads and the flex cable assembly comprises a plurality of pogo pins arranged to make electrical contact with respective ones of the contact pads when the contact pads are arranged on the flex cable assembly and the clamp body in the closed position.

18. The actuator coil assembly according to claim 9, wherein the clamping mechanism is stable in the open and closed positions.

19. A method for releasably holding a contact pad of a head gimbal assembly in electrical contact with a flex cable assembly of an actuator coil assembly, the method comprising:
operating a latch rotatably connected to a clamp body to position the clamp body in an open position, wherein the clamp body is pivotally connected to an actuator body of the actuator coil assembly;
position the contact pad of the head gimbal assembly on the flex cable assembly; and
operating the latch to position the clamp body in a closed position, wherein the clamp body is configured to apply pressure to the contact pad of the head gimbal assembly to make electrical contact with the flex cable assembly in the closed position.

* * * * *